US012290202B2

(12) United States Patent
Mazzon et al.

(10) Patent No.: US 12,290,202 B2
(45) Date of Patent: May 6, 2025

(54) MACHINE AND METHOD TO PREPARE BEVERAGES

(71) Applicant: DE' LONGHI APPLIANCES S.R.L. CON UNICO SOCIO, Treviso (IT)

(72) Inventors: Renzo Mazzon, Silea (IT); Gianpaolo Trevisan, San Martino Buon Albergo (IT); Alessandro Bellese, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 850 days.

(21) Appl. No.: 17/598,861

(22) PCT Filed: Mar. 20, 2020

(86) PCT No.: PCT/IT2020/050067
§ 371 (c)(1),
(2) Date: Sep. 27, 2021

(87) PCT Pub. No.: WO2020/194356
PCT Pub. Date: Oct. 1, 2020

(65) Prior Publication Data
US 2022/0175181 A1    Jun. 9, 2022

(30) Foreign Application Priority Data

Mar. 26, 2019   (IT) .......................... 102019000004379

(51) Int. Cl.
*A47J 31/52*   (2006.01)
*A47J 31/06*   (2006.01)

(52) U.S. Cl.
CPC .......... *A47J 31/5253* (2018.08); *A47J 31/06* (2013.01); *A47J 31/5251* (2018.08)

(58) Field of Classification Search
CPC .................................................... A47J 31/5253
See application file for complete search history.

(56) References Cited

U.S. PATENT DOCUMENTS

2018/0303271 A1    10/2018   Glucksman et al.

FOREIGN PATENT DOCUMENTS

EP           1 302 140 A1      4/2003

OTHER PUBLICATIONS

International Search Report and Written Opinion for PCT/IT2020/050067, mailed May 12, 2020.

*Primary Examiner* — Sean M Michalski
(74) *Attorney, Agent, or Firm* — MARSHALL, GERSTEIN & BORUN LLP

(57) ABSTRACT

A machine to prepare beverages includes at least one tank for the water fluidically connected to a filtering container suitable to contain an aromatic mixture; a pump to feed the water from said tank; a heating device to heat the water in transit; and a control and command unit connected to a user interface. The invention also concerns a method to prepare beverages.

14 Claims, 1 Drawing Sheet

MACHINE AND METHOD TO PREPARE BEVERAGES

FIELD OF THE INVENTION

The present invention concerns a machine, whether it be automatic or semiautomatic, suitable for preparing beverages, advantageously hot, such as coffee, tea, infusions of various types, or even only water, and a method to prepare said beverage.

BACKGROUND OF THE INVENTION

Machines are known which produce American-type coffee, that is, those long coffees also called "drip coffees", obtained by infusing a quantity of coffee powder with hot water.

The Applicant set himself the problem of improving this type of machine, making it suitable for supplying a wide range of beverages, guaranteeing the required organoleptic characteristics and therefore high quality.

Current machines have a tank for the water, a water heating device, a container suitable for positioning a filtering element for the coffee powder, or other aromatic mixture, which is passed through by the hot water, and a container, for example a carafe, normally suitable to contain a maximum volume such as to fill a certain number of cups, or glasses for the end users.

The heating device is generally located in cooperation with the tank, or located downstream of the tank, for example along a pipe that connects an outlet of the tank to a filtering container.

When the heating device is activated, the heated water is made to flow from the tank to the filtering container in a known manner, whether it be convective motion, or by means of a pumping element, and the infusion of the beverage takes place at ambient pressure.

The mixture can be introduced or loaded automatically into the filtering element. Means to contain the powder mixture and/or metering and automatic loading means may be present.

It is also known that the method for preparing coffee provides that the temperature of the water for the infusion of coffee must be contained in a reduced and controlled range of temperatures, to ensure the correct extraction of the aromas.

The optimal temperature range, in particular for the coffee beverage, is generally comprised between 92° and 96°. In order for the water to come into contact with the aromatic substance at the desired temperature, on the one hand it is necessary to heat the water to a temperature slightly higher than that required, so as to take into account the heat losses, and on the other hand it is important to prevent it from reaching boiling point, with consequent alteration of the aromatic substances and generation of steam.

In machines where the water heating device is interfaced with sensors to verify the thermal level reached by the water, said machines, if located at considerable altitudes, in their attempt to reach a threshold physically impossible to obtain in relation to the conditions of ambient pressure, can possibly supercharge the heating elements, creating an excessive generation of steam or, in the worst case, an overheating of the whole machine, with serious risks for the safety of the users.

In other cases, if starting the preparation of the beverage is subordinate to reaching a minimum temperature point of the water for the infusion, it may happen that the machine never starts the process, precisely because the required temperature cannot physically be reached because of the pressure conditions related to the altitude at which the machine is located.

Furthermore, reaching the boiling temperature of the water can cause excessive evaporation of the water, distorting the measurement of the water supplied, which can lead to an infused beverage whose predefined characteristics are altered.

As a further disadvantage, the boiling of the water for preparing the beverage can cause the emission of water vapor, which becomes a source of potential risks for the safety of the user.

Furthermore, an excessive boiling of the water also entails, as a further disadvantage, an excessive deposit of limescale, which compromises the thermal and control efficiency of the machine.

The machines of known solutions have the disadvantage that they are not able to precisely regulate the temperature of the water delivered onto the aromatic substance, so that it can be heated excessively and the organoleptic characteristics of the infused beverages can be altered with respect to those desired, with a consequent decrease in the quality of the beverage itself.

Another disadvantage is that, depending on the place of installation/use, the machines that produce American coffee can include safety problems for the user, due to the difficulty of maintaining optimal control of the heating temperatures of the water for preparing the beverages.

Another disadvantage is that known machines do not allow to control, simply and quickly, the method to prepare the infused beverage, so as to guarantee the quality thereof regardless of the different places where the machine is installed/used, in particular in relation to the different conditions of environmental pressure, and/or the type of aromatic mixture used, also at each cycle of preparing a beverage.

US-A-2018/303271 describes a machine for preparing coffee beverages, which comprises a pressure transducer which detects a difference in atmospheric pressure and signals it to a controller, which limits the upper temperature of the water delivered to a few degrees below the boiling temperature at the pressure detected.

The Applicant therefore set himself the aim of improving the efficiency of a machine of the type described above, avoiding the disadvantages identified above, and others.

A first purpose of the present invention is to provide a machine able to guarantee a high quality of the infused beverage with the desired organoleptic characteristics in all conditions of use, regardless of the place where the machine is installed/used and of environmental conditions, in particular pressure.

It is another purpose to avoid safety problems for the user that can occur in the event of generation and emission of steam due to boiling water or overheating of the machine.

It is also an additional purpose to facilitate and simplify the use of this machine by the user.

It is also a purpose of the invention to limit limescale deposits to a minimum and guarantee the correct functioning of the appliance, also reducing cleaning and maintenance interventions to a minimum.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, embodiments described here concern a machine for preparing beverages by infusion which allows to optimize the temperature of the heated water on each occasion according to the place where the machine is installed/used and/or the type of beverage to be prepared.

In particular, the machine for preparing beverages according to the invention is a "drip coffee" type machine, comprising a water tank, a filtering container into which a flavoring substance is introduced on each occasion, and a hydraulic circuit along which a pump and a heating device are provided to take the water from the tank, heat it to the desired temperature and supply it to the filtering container.

According to some embodiments, sensor means are provided to check that the water supplied has the desired temperature. The sensor means to check the temperature can be disposed downstream of the heating device, or in relation to a terminal part thereof.

According to some embodiments, the machine comprises a control and command unit configured to regulate the functioning of the pump and the heating element to prepare the beverage requested by the user.

According to some embodiments, the control and command unit is also configured to regulate at least the functioning of the heating device according to an actual boiling temperature value of the water, correlated to an ambient pressure surrounding the machine itself, in such a way that the temperature of the water for preparing the beverage remains below a safety temperature value lower than the actual boiling temperature value.

According to some embodiments, the machine comprises indicator means to indicate an actual boiling temperature value of the water, correlated to the environmental pressure, configured to provide the control and command unit with information correlated to this value.

According to some embodiments, the indicator means are configured to monitor the temperature growth curve in real time, with each beverage preparation cycle, so as to automatically adapt the functioning of the machine to any changes in environmental conditions, without needing to know them in advance.

In particular, unlike what happens with those machines mainly intended for the preparation of espresso coffee, in which the preparation of the beverage takes place under pressure, in machines for preparing American coffee the hydraulic circuit is open and the preparation of the beverage takes place at ambient pressure.

According to some embodiments, the machine has means to optimize the preparation temperature of the beverage, considering the effect of the ambient pressure, for example corresponding to atmospheric pressure, and determined by the altitude of the place where the machine is installed/used, on the temperature of the water itself. The boiling temperature of the water is in fact lower than 100° C. when the environmental pressure is lower than one atmosphere, indicatively corresponding to an altitude of 0 meters above sea level. By considering the actual boiling temperature of the water, it is possible to use the coffee machine, for example, even in high mountains, avoiding the generation of problems due to the fact that it does not boil at around 100° C. but at a lower temperature.

By not preparing the beverage with boiling water, it is possible to avoid the alteration of its predefined characteristics and the other disadvantages mentioned above.

According to some embodiments, the control and command unit is configured to estimate the actual boiling temperature value by controlling the heating speed of the water for preparing the beverage, for example by calculating the derivative of the temperature detected by the sensor means by means of an algorithm.

According to a variant, the machine can comprise a device to measure the ambient pressure connected to the command and control unit. According to these embodiments, the command and control unit can be configured to receive a signal indicative of the ambient pressure surrounding the machine, to calculate/estimate a boiling temperature value and to consequently control the heating device in such a way as to heat the water to a safety temperature lower than the calculated/estimated value.

According to another variant, the machine can comprise a user interface connected to the command and control unit and configured to receive from the user at least an altitude level and/or an ambient pressure level of the place where the machine is used.

This information can be considered in association with the temperature growth curve to define the safety temperature limits.

According to some embodiments, the user interface is also configured to receive from the user an indication of the type of beverage to be prepared, with specific organoleptic characteristics.

According to some embodiments, the control and command unit is configured to limit the temperature of the water for preparing beverages, checking that the temperature defined by the type of beverage and the settings entered by the user do not exceed a safety value lower than the boiling temperature of water.

According to a variant, the control and command unit can comprise, or be connected to, a memory unit in which tables and/or graphs are installed, or are installable, in which there are standard parameters and/or limit parameters, relating to the altitude and/or ambient pressure values and/or boiling temperatures of the water and/or safety temperatures relating to the place of installation/use, and the control and command unit can at least regulate the functioning of the heating device also based on said tables and/or graphs.

According to some embodiments, before authorizing the preparation of the beverage on the basis of the instructions given by the user, the control and command unit can be configured to check the correctness and compliance thereof, at least in relation to the limits associated with the specific beverage and with the safety temperature.

Embodiments described here concern a method to prepare a beverage of the type and with the organoleptic characteristics selected by a user in a machine of the drip coffee type.

According to some embodiments, the method provides to:
receive a command to prepare a beverage selected by a user by means of a user interface;
determine the functioning parameters of a pump and heating device as a function of the selected beverage, in which the method also provides to monitor in real-time the growth curve of the temperature of the water for preparing the beverage, and to regulate at least the functioning of the heating device as a function of the growth curve and an actual boiling temperature value of the water, correlated to an ambient pressure surrounding the machine itself, so that the temperature of the water for preparing the beverage remains below a safety temperature value lower than the boiling temperature value, that is, so that it never boils in any ambient pressure condition whatsoever.

According to some embodiments, the method provides to control the heating speed of the water for preparing the beverage by calculating the derivative of the temperature by means of an algorithm to determine when the water temperature approaches the boiling value.

According to this embodiment, the method can provide to turn off the heating device, or possibly to make it function intermittently, when the derivative of the temperature is lower than a certain threshold value.

According to a variant, the method provides to receive data relating to the place where the machine is used, for example when the machine is turned on and/or periodically and/or at the time it is restarted following a change in the place where it is installed/used.

According to one embodiment, the data relating to the place of installation/use can be an ambient pressure value of the place of installation/use or an indication of the altitude.

According to some embodiments, the method can provide to measure the atmospheric pressure by means of a pressure measuring device and to calculate, on the basis of it, the boiling temperature value and therefore a safety temperature value to which to heat the water for preparing the beverage.

According to another variant, the method provides to receive the data relating to the place of installation/use, or an indication relating to the altitude and/or ambient pressure from a user, for example by means of the user interface.

According to one embodiment, the method provides to estimate and/or calculate the boiling temperature of the water corresponding to the place where it is installed/used by comparing the data received with tables and/or graphs relating to the temperature, pressure and/or altitude pre-memorized in a memory unit.

According to one embodiment, the method can provide to memorize in the memory unit the boiling temperature of the water and/or a safety temperature lower than the boiling temperature of water and/or the extremes of the preparation ranges of the beverage suitable for the boiling value of the water calculated and/or estimated on each occasion.

According to some embodiments, the method provides that the control and command unit limits the temperature of the water for preparing the beverages, verifying that the temperature defined by the type of beverage and the settings entered by the user does not exceed the safety temperature.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Figure 1:
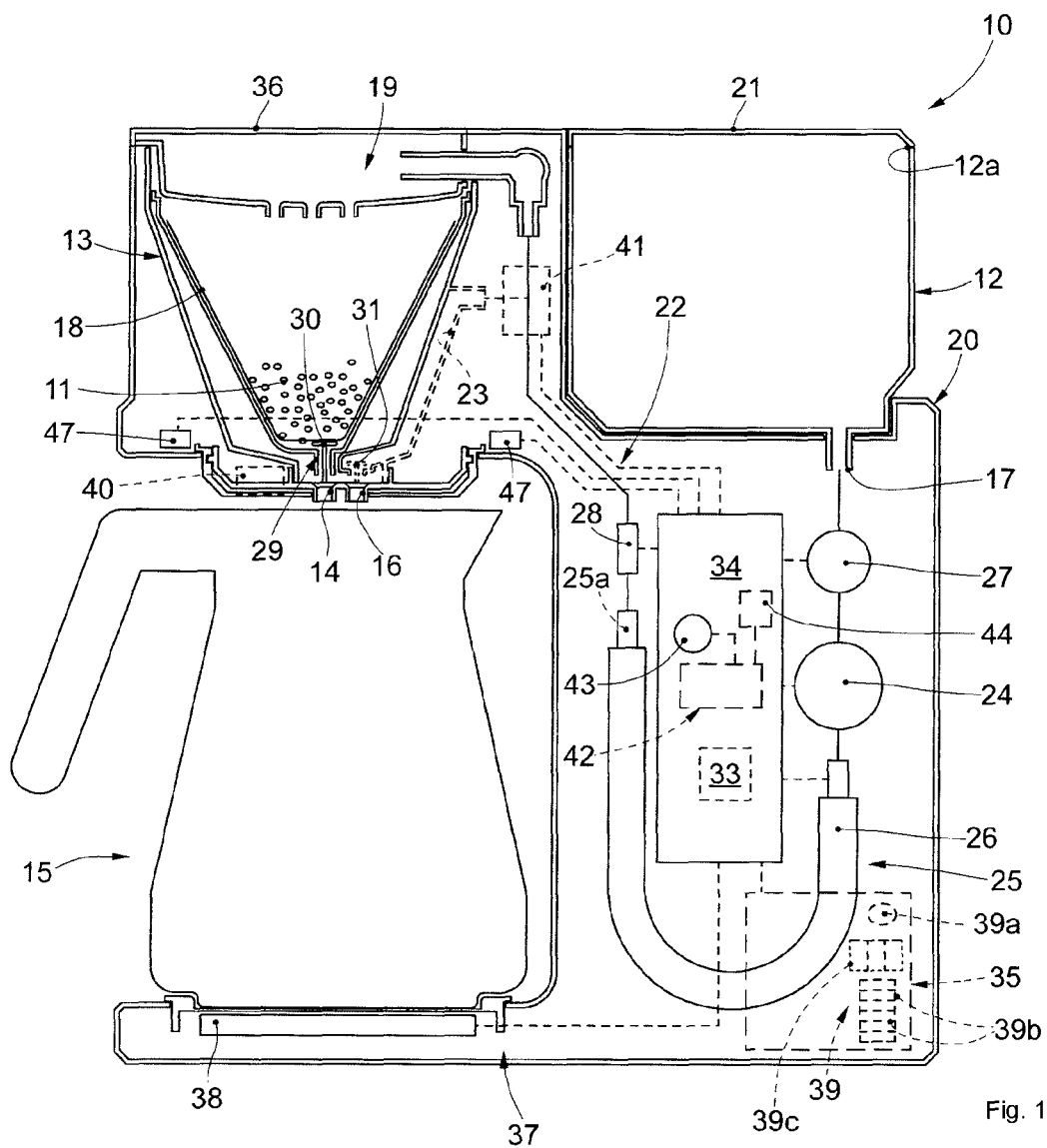
FIG. 1 is a schematic view of a machine for preparing beverages according to embodiments described here.

Embodiments described here with reference to FIG. 1 concern a machine 10 for the preparation and delivery of a hot or cold beverage, starting from an aromatic mixture 11 in powder or ground form, by infusing it, or mixing it with water.

The machine 10 allows to optimize on each occasion the temperature of the water for preparing the beverage according to the place where the machine 10 is installed/used and/or the type of beverage, for example a beverage with precise organoleptic characteristics.

The machine 10 comprises a tank 12 for water, fluidly connected to a filtering container 13 suitable to contain the aromatic mixture 11 to be infused.

For example, the aromatic mixture 11 can be a mixture in powder form and/or with a desired grain size, in leaves, or portions thereof, of coffee, tea, other vegetable substance, or other.

The machine 10 also comprises an outlet 14 for the beverage, cooperating with the filtering container 13, through which the infused beverage can be delivered toward a delivery zone and inside a container 15 disposed in the latter.

The tank 12 can generally be a container configured to contain a certain quantity of water for preparing a beverage. The volume of the tank 12 can be, for example, at least equal to the volume of water necessary to fill a carafe.

The tank 12 can be provided with an introduction aperture 12a, associated with a lid 21, through which the water can be introduced into it, and an outlet aperture 17, from which the desired amount of water can be taken on each occasion.

According to some embodiments, the tank 12 can be positioned inside a housing 20 of the machine 10, or attached to it, possibly in a removable manner, so as to be cleaned and/or filled.

According to some embodiments, the housing 20 is provided with a support base 37 for the container 15.

According to possible variants, the support base 37 can be provided with heating means 38 that can be selectively activated to keep the beverage delivered in the container 15 hot.

According to a variant, the tank 12 can be associated with a continuous water supply source.

The tank 12 is connected to the filtering container 13 by means of a hydraulic circuit 22.

The hydraulic circuit 22 is connected on one side to the outlet aperture 17 of the tank 12 and on the opposite side to a diffusion head 19, disposed above the filtering container 13 and configured to diffuse the water coming from the tank 12 above the aromatic mixture 11 so as to increase the contact between the water and the aromatic mixture 11 itself.

According to some embodiments, the filtering container 13 for the mixture can have a funnel shape, and a filtering element 18 suitable to retain the solids of the aromatic mixture 11 can be inserted in it, preventing them from being delivered together with the infused beverage.

According to some embodiments, access means 36 and/or movement means can be provided, configured to allow access to the filtering container 13 to be able to introduce a desired quantity of aromatic mixture 11 on each occasion, and/or remove it together with the possible filtering element 18 at the end of the delivery of the beverage prepared.

The machine 10 also comprises a heating device 25, disposed along the hydraulic circuit 22, and configured to heat the water in transit through it.

By way of example, the heating device 25 can be a through-flow boiler comprising a transit channel 25a for the water and at least one heating element 26, for example a resistance, associated with the transit channel 25a and configured to heat the water inside it.

The machine 10 also comprises a pump 24, configured to remove from the tank 12 the quantity of water necessary to prepare the selected beverage and feed it along the hydraulic circuit 22 and toward the heating device 25.

According to some embodiments, the pump 24 has an adjustable flow rate, so as to be able to adjust the speed of the water that passes through the heating device and possibly through the aromatic mixture 11.

According to some embodiments, the machine 10 comprises a flow meter 27, or other means to detect the flow disposed in the tank 12 and/or along the hydraulic circuit 22 to measure the quantity of water in transit through it.

According to some embodiments, the flow meter 27 is located upstream of the pump 24, allowing a faster and more effective detection of the flow rate and, therefore, a dynamic and real-time adjustment of the pump 24.

According to some embodiments, the machine 10 also comprises temperature sensors 28, disposed along the hydraulic circuit 22 and configured to detect the temperature of the water in transit.

According to some embodiments, the temperature sensors 28 can be disposed downstream of the heating device 25, or positioned inside it, possibly in correspondence with the exit end of the transit channel 25a.

According to some embodiments, the machine 10 comprises a control and command unit 34 functionally connected to a user interface 35, configured to condition the functioning of the pump 24 and the heating device 25 by optimizing the temperature of the heated water.

According to some embodiments, the control and command unit 34 is configured to control the temperature of the water for preparing the beverage so that it does not reach boiling temperature due to the effect of the ambient pressure, for example corresponding to the atmospheric pressure and determined by the altitude of the place where the machine 10 is installed/used.

According to some embodiments, the machine 10 comprises boiling temperature indicator means 42 configured to provide the control and command unit 34 with information on an actual boiling temperature value of the water, correlated to the ambient pressure.

According to some embodiments, the boiling temperature indicator means 42 are configured to monitor in real time the growth curve of the temperature of the water for preparing the beverage, and the control and command unit 34 is configured to receive the data relating to the temperature growth curve and automatically and in real time adapt the functioning of at least the heating device 25 to keep the water temperature below the boiling temperature.

Figure 2:
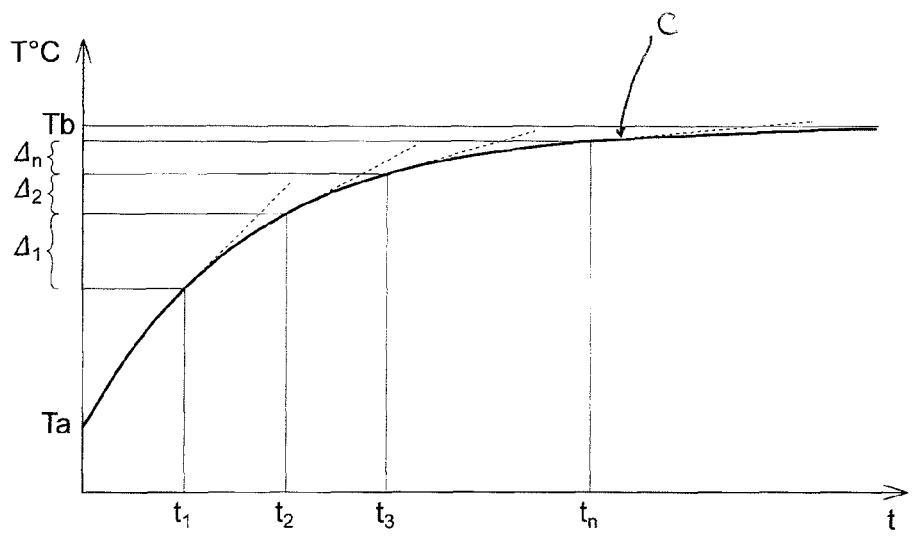
FIG. 2 is a schematic graph that illustrates the trend of temperature over time.

FIG. 2 shows by way of example the trend of a temperature growth curve C over time t, from a minimum temperature Ta corresponding to the ambient temperature, to a maximum temperature Tb corresponding to the boiling temperature.

According to some embodiments, the boiling temperature indicator means 42 comprise algorithms to limit the temperature of the water for preparing the beverage at most to a safety temperature lower than the boiling temperature.

According to some embodiments, the boiling temperature indicator means 42 comprise algorithms implemented by the control and command unit 34 configured to monitor in real time the heating speed of the water for preparing the beverage.

According to some embodiments, the boiling temperature indicator means 42 monitor the heating speed of the water for preparing the beverage by calculating the derivative of the temperature over time, so as to control when the value of the derivative approaches zero.

As can also be seen in FIG. 2, in fact, the straight lines tangent to the curve C at instants t1, t2, ... tn, corresponding to the derivative of the temperature over time, have a gradually decreasing slope.

In other words, the temperature indicator means 42 monitor the temperature growth curve and, when the value of the derivative approaches zero, determine that a boiling temperature has been reached.

For example, the control and command unit 34 can receive at defined intervals t1, t2, ... tn, the temperature values detected by the temperature sensors 28, calculating on each occasion the difference $\Delta T1$, $\Delta T2$, ... $\Delta Tn$ with respect to the previous value, until a limit difference value is reached, corresponding to a maximum safety temperature value to which to heat the water for preparing the beverage.

According to some embodiments, it can also be provided that, based on the received data from the temperature sensors 28, the control and command unit 34 determines respective temperature growth curves, which can be memorized in a memory unit 33.

The control and command unit 34 can be configured to compare the water heating speed during the preparation of the beverage with the previously memorized data, so as to monitor the functioning of the heating device 25. For example, if the temperature growth curve slows down over time, a problem in the heating resistances can be detected, or a possible accumulation of limescale which prevents a correct transfer of heat to the water.

According to a variant, which can be combined with the other embodiments described here, the boiling temperature indicator means 42 comprise a device to measure the ambient pressure 43, for example a barometric pressure sensor, configured to send the ambient pressure data to the control and command unit 34.

According to another variant, which can be combined with the other embodiments described here, the boiling temperature indicator means 42 comprise a device 44 to detect the geographical position, configured to detect and communicate the geographical position of the machine 10 to the control and command unit 34.

The device 44 to detect the geographical position can be a GPS module provided on the machine 10, or a connection device via Wi-Fi, BlueTooth, or other data transmission protocols, suitable to receive information via a computer or other device.

According to another variant, which can be combined with the other embodiments described here, the boiling temperature indicator means 42 can comprise commands 39, for example provided on the user interface 35, by means of which a user can enter data relating to the place where the machine 10 is installed/used. This data can be, for example, an altitude level and/or an ambient pressure level.

The commands 39 can comprise one or more of push buttons, selection knobs, and/or a touch sensitive screen, by means of which the user can for example select the sea level, hill, low or high mountain, and/or indicate the corresponding altitude or altitude level, for example 0 meters above sea level, 600 m asl, 1200 m asl, 1600 m asl, and/or ambient pressure, for example 1 atm., 0.93 atm., 0.86 atm., 0.82 atm.

According to a variant, the control and command unit 34 can comprise or be connected to the memory unit 33, in which are installed or installable tables and/or graphs and/or algorithms and/or maps in which there are standard parameters, or, or also, limit parameters, relating to the values of altitude and/or ambient pressure and/or boiling temperatures of the water and safety temperatures relating to the place of installation/use.

According to some embodiments, the user interface 35 comprises a plurality of commands 39a-39c by means of which the user can select a specific type of beverage to be delivered, for example coffee or tea, and/or the precise organoleptic characteristics, for example an intensity of the beverage between light, normal, or strong.

According to some embodiments, for each selectable beverage infused, information relating to the operating parameters of preparation of each selectable beverage can be memorized in the memory unit 33.

According to some embodiments, the control and command unit 34 is configured to modify the temperature ranges required for preparing the beverages, reducing the extremes if they are higher than a safety temperature value correlated to the boiling temperature, possibly saving these modified ranges in the memory unit 33 to be able to reuse them when the same operating conditions occur, for example the same environmental conditions, or the same temperature growth trend.

By way of example, while a water temperature preferably comprised between about 92° C. and about 96° C. is required for the coffee beverage, a water temperature comprised between about 70° C. and about 95° C. is preferable for preparing tea, depending on the quality of the tea, or infusion, used.

As a further example, at 1,067 meters above sea level the boiling temperature of water is indicatively 96° C., at 2,286 m asl it is 92° C.

By way of example, a water temperature preferably comprised between about 92° C. and about 96° C. is required for a coffee beverage. At altitudes comprised between 1,067 m asl and 2,286 m asl the temperature of the water for preparing the beverage will be limited at most to the safety temperature, lower than the boiling temperature, as shown for example in the following table, checking its value in real time by assessing the speed of variation or referring to the temperature data memorized in the memory unit 33.

By way of example, the boiling temperatures as a function of altitude can take the following values:

| Height ft (meters) | Boiling point - Celsius |
|---|---|
| 0 feet (0 m.) | 100° C. |
| 1500 feet (457 m.) | 98.5° C. |
| 3500 feet (1067 m.) | 96° C. |
| 5000 feet (1524 m,) | 94.5° C. |
| 6500 feet (1981 m.) | 93° C. |
| 7000 feet (2134 m.) | 92.5° C. |
| 7500 feet (2286 m.) | 92° C. |
| 8000 feet (2438 m.) | 91.5° C. |
| 8500 feet (2591 m.) | 91° C. |
| 9000 ft. (2743 m.) | 90.5° C. |
| 9500 feet (2895 m.) | 90° C. |
| 10000 feet (3048 m.) | 89.5° C. |

A similar table can for example be memorized in the memory unit 33 and the control and command unit 34 can use the data reported therein to relate the altitude at which the machine 10 is located with the safety temperature at which it must be set to prevent the water from boiling.

It is obvious that in order for the water to come into contact with the aromatic substance at the desired temperature, it is necessary to heat it to a temperature slightly higher than that required, so as to take into account the heat losses.

According to possible variant embodiments, two outlets are provided, one 14 for the beverage and one 16 for the hot water only, cooperating with a diversion channel 23 separate from the filtering container 13, and communicating with the hydraulic circuit 22.

According to a further construction variant, one of the two outlets 14 or 16 could be used in cooperation with a special device, not shown, to deliver beverages through the use of specific capsules/pods containing aromatic mixtures 11, for example coffee, tea, herbal infusions, etc.

According to possible embodiments, the first outlet 14 and the second outlet 16 are advantageously disposed close to each other, so as to allow the delivery of the infused beverage or hot water in the same delivery zone.

According to these embodiments, each outlet 14, 16 is associated with respective selective delivery devices 29.

For example, the selective delivery devices 29 can comprise a first valve 30 associated with the beverage outlet 14 and a second valve 31 associated with the hot water outlet 16.

Closing the valves 30, 31 allows, in particular, to be able to remove the container 15 during the delivery of the beverage, without the risk of dripping.

According to other embodiments, described for example with reference to FIG. 2, the machine 10 comprises a diversion element 41 disposed along the hydraulic circuit 22 and configured to selectively and alternately divert the flow of water toward the filtering container 13, or toward the diversion channel 23.

According to possible solutions, the diversion element 41 can comprise a three-way valve, of which two ways are associated with the hydraulic circuit 22 respectively as an input and as a first output, and one way associated as a second output with the diversion channel 23.

According to some embodiments, the diversion element 41 can be driven by the control and command unit 34 according to the selection made by the user.

According to possible variant embodiments, a selector device 40 can be provided which can be manually driven by the user and configured to act on the diversion element 41.

According to other embodiments, the selector device 40 can be connected to the selective delivery devices 29 associated with the first 14 and the second output 16 and directly or indirectly condition their functioning to allow or prevent the delivery of the beverage.

According to a variant, the selector device 40 can be integrated into the user interface 35.

According to other embodiments, the diversion element 41 assumes the first, or the second operating state, according to the position of the selector device 40.

According to other embodiments, position sensor means 47 can be provided, configured to detect the position of the selector device 40 and communicate it to the control and command unit 34, which according to the data received modifies the state of the diversion element 41.

Embodiments described here also concern a method to prepare a beverage of the type and with the organoleptic characteristics selected by a user in a machine 10 of the drip coffee type.

According to some embodiments, the method provides to:

receive a command to prepare a beverage;

determine the functioning parameters of a pump and heating device according to the beverage selected, wherein the method also provides to regulate at least the functioning of the heating device according to an actual boiling water temperature value, correlated to an ambient pressure surrounding the machine itself, so that the temperature of the water for preparing the beverage never comes to boiling point.

According to some embodiments, the method provides that the control and command unit 34 regulates the functioning of the heating device 25 in such a way as to limit the temperature of the water for preparing the beverage at most to a safety temperature, lower than the boiling temperature.

According to some embodiments, the method provides to control the heating speed of the water for preparing the beverage by calculating the derivative of the temperature by means of an algorithm to determine when the water temperature approaches the boiling value.

According to some embodiments, the method provides to monitor the temperature growth curve in real time, with each beverage preparation cycle. In this way the functioning of the machine 10 can automatically adapt to any variation in the environmental conditions, in particular the ambient pressure, without needing to know said pressure in advance.

According to a variant, the control and command unit 34 limits the temperature of the water for preparing the beverage at most to the safety temperature, for example by comparing it with values of the extremes of the preparation ranges of the beverage suitable for the boiling value of the water and memorized in the memory unit 33.

According to a variant, the method provides to detect and/or receive data relating to the place where the machine 10 is installed/used and to calculate a safety temperature value on the basis of the data received.

According to some embodiments, the data relating to the place of installation/use can correspond to an ambient pressure value measured by the pressure measuring device 43, or to an altitude and/or ambient pressure value of the place of installation/use inserted by the user via the interface 35.

According to some embodiments, the data relating to the place of installation/use can correspond to the geographical position of the machine 10 detected by means of the geographical position detection device 44.

According to one embodiment, the method can provide to detect and/or receive the data relating to the ambient pressure and/or the altitude of the place of installation/use at the time the machine is turned on and/or periodically and/or at the time the machine is turned on again following a variation in the place of installation/use and/or when inserted by the user.

According to some embodiments, the method can provide to calculate and/or estimate the actual boiling temperature value as a function of the data detected and/or received and consequently determine a safety temperature value in order to regulate the functioning of the heating device 25 so that the temperature of the water for preparing the beverage, detected by the temperature sensors 28, remains at all times lower than or equal to the safety temperature value.

It is clear that modifications and/or additions of parts may be made to the machine 10 and method for preparing a beverage as described heretofore, without departing from the field and scope of the present invention.

It is also clear that, although the present invention has been described with reference to some specific examples, a person of skill in the art shall certainly be able to achieve many other equivalent forms of machine 10 and method for preparing a beverage, having the characteristics as set forth in the claims and hence all coming within the field of protection defined thereby.

The invention claimed is:

1. A machine to prepare beverages comprising: at least one tank for water, fluidly connected to a filtering container arranged to contain an aromatic mixture; a pump to feed water from said tank; a heating device to heat the water in transit; temperature sensors to detect a temperature of the heated water and a control and command unit operatively coupled to a memory and connected to a user interface comprising boiling temperature indicator means configured to determine an actual water boiling temperature value provided to the control unit when a value of a derivative of a temperature growth curve approaches zero and using temperature sensors monitors in real time the temperature growth curve of the temperature of the water for preparing the beverage, and to provide said control and command unit with information on the actual water boiling temperature value, wherein said control and command unit is configured to regulate at least the functioning of the heating device as a function of a heating speed and of said actual water boiling temperature value, correlated to an ambient pressure surrounding the machine itself, so that the temperature of the water for preparing the beverage remains below a safety temperature value lower than said actual boiling temperature value.

2. The machine as in claim 1, wherein said memory comprises elevation and boiling temperature values, and wherein the boiling temperature indicator means comprises calculations implemented by said control and command unit and configured to calculate in real time a derivative of the temperature over time in order to determine the heating speed of the water for preparing the beverage and to determine a trend of said growth curve.

3. The machine as in claim 1, and further including an ambient pressure measurement device configured to communicate an ambient pressure value to said control and command unit, and wherein said control and command unit is configured to convert said pressure value into a water boiling temperature by means of tables and/or graphs stored in the memory, to determine a safety temperature of the water for preparing the beverage.

4. The machine as in claim 1, further including a GPS module, Wi-Fi, Bluetooth or other data transmission protocols suitable to receive data via a computer relating to geographic position and/or elevation and/or altitude and/or ambient pressure and communicate the data to said control and command unit, and said control and command unit is configured to determine the safety temperature of the water for preparing the beverage based on said data.

5. The machine as in claim 1, wherein the boiling temperature indicator means comprise commands provided on the user interface arranged to allow a user to enter a datum relating to a location where the machine is installed/used and said control and command unit is configured to calculate and/or estimate the actual boiling temperature value and a safety temperature value as a function of said datum received.

6. A method to prepare a beverage in a machine for preparing beverages comprising a tank, fluidly connected to a filtering container suitable to contain an aromatic mixture, wherein the method comprises:

receiving at entry in a control and command unit having a memory a command relating to type and organoleptic characteristics of a beverage selected by the user using a user interface;

determining operating parameters for a pump and a heating device to regulate a water temperature and a flow rate as a function of the selected beverage; and detecting the temperature of the water for preparing the beverage using sensors to determine an actual water boiling temperature value provided to the control and command unit when a value of a derivative of a temperature growth curve of the water temperature approaches zero and using temperature sensors monitoring, in real time the growth curve of the temperature of the water for preparing a beverage, and regulating at least the functioning of the heating device as a function of said growth curve and an actual boiling temperature value of the water, correlated to an ambient pressure surrounding the machine itself, so that the temperature of the water for preparing the beverage remains below a safety temperature value lower than said boiling temperature value.

7. The method as in claim 6, including controlling in real time the heating speed of the water, calculating the derivative of the growth curve to determine when said detected temperature approaches the boiling value and to deactivate said heating device when the value of the derivative is lower than a defined threshold value.

8. The method as in claim 6, including receiving in a control unit at defined intervals the temperature values detected by said temperature sensors and to calculate on each occasion a difference with respect to the previous value until a limit difference value is reached, corresponding to a maximum temperature value to which to heat the water for preparing the beverage.

9. The method as in claim 6, including measuring the atmospheric pressure by means of a pressure measurement device and also based on this to calculate the boiling temperature value and therefore a safety temperature value to which to heat the water for preparing the beverage.

10. The method as in claim 6, including receiving a datum relating to the location where the machine is installed/used, that is, an indication relating to the altitude and/or to the ambient pressure entered by the user by means of said user interface and to estimate and/or calculate the boiling temperature of the water corresponding to the location where the machine is installed/used, comparing the datum received with tables and/or graphs relating to temperature, pressure and/or altitude pre-memorized in the memory.

11. The method as in claim 6, including detecting a datum relating to the location where the machine is installed/used by means of a device to detect the geographical position communicating with said control and command unit and to determine the boiling temperature as a function of said position.

12. The method as in claim 10, including detecting and/or receiving the setting of the datum relating to the ambient pressure and/or to the location where the machine is installed/used when the machine is turned on and/or periodically and/or when the machine is restarted following a variation in the location where it is installed/used.

13. The method as in claim 6, including modifying user selected temperature ranges required for preparing the beverages selected by said user interface, reducing extremes if they are higher than said safety temperature value correlated to the boiling temperature, and saving modified ranges in order to be able to reuse them when the same operating conditions occur.

14. The method as in claim 6, including storing in the memory one or more temperature growth curves determined during the preparation of a beverage, and comparing the actual heating speed measured with the memorized data in order to recognize any possible malfunctions of said heating device.

* * * * *